July 4, 1939.   H. A. BERLINER   2,164,489
VARIABLE PITCH PROPELLER
Filed July 27, 1936   2 Sheets-Sheet 2

INVENTOR.
HENRY A. BERLINER
BY
McConkey & Booth
ATTORNEYS.

Patented July 4, 1939

2,164,489

UNITED STATES PATENT OFFICE 2,164,489

VARIABLE PITCH PROPELLER

Henry A. Berliner, Washington, D. C., assignor, by mesne assignments, to Engineering and Research Corporation, Riverdale, Md., a corporation of Maryland Application July 27, 1936, Serial No. 92,823

16 Claims. (Cl. 170—163)

This invention relates to variable pitch propellers and more particularly to novel pitch changing mechanism for changing the pitch of the propeller blades.

One of the objects of the invention is to provide a variable pitch propeller in which the blade pitch is controlled through a variable speed transmission which may, if desired, be operated from the propeller shaft.

Another object of the invention is to provide pitch limiting means to prevent overadjustment of the blade pitch.

Another object is to provide novel pitch indicating means, which may, if desired, be operated in conjunction with the pitch limiting means.

Another object is to provide an automatic speed responsive control to adjust the propeller pitch, manual means preferably being provided to control the pitch independently of the automatic means.

One desirable arrangement for carrying out the above and other objects of the invention includes a friction element driven from the propeller shaft through gearing. The friction element is connected to a second friction element through an adjustable roller and the second friction element drives a worm meshing with a worm gear on the propeller blade. Preferably the worm is driven through a floating ring so that when the ring is turning at the same speed as the propeller shaft the blade pitch will remain constant, but when the ring is turning either faster or slower than the shaft the blade pitch will be varied. If desired a clutch may be provided to lock the ring to the shaft.

A member is preferably provided to move axially of the propeller shaft in accordance with the blade pitch and is connected to the roller control mechanism through a lost motion connection so that when the blade has reached a predetermined pitch the roller will be set in its neutral position in which the ring is driven at the same speed as the propeller shaft. This member may also serve as a convenient connection for a pitch indicator since its movement is always proportional to pitch changes.

In one arrangement the member may take the form of a rack meshing with gear teeth on the propeller blade and in another form it may be a rod screw threaded to the worm. In both forms it will always occupy a position axially of the propeller shaft which corresponds to the blade pitch so that it may serve both as an accurate pitch indicator and as an efficient pitch limiting device.

Preferably the roller is automatically controlled by a governor driven by the propeller shaft so that when the speed increases the pitch will be increased and vice versa. In this way the propeller will be maintained at the proper pitch at all times. The governor may be connected to the propeller shaft through a clutch which can be disengaged at will to leave the transmission subject to manual control.

Other objects, advantages and desirable features of the invention will be apparent from the following description when read in connection with the accompanying drawings in which:

Figures 2 and 3 are partial sections on the line II—II and III—III of Figure 1;

Figure 4 is a detail view of a modified construction; and

Figure 1:
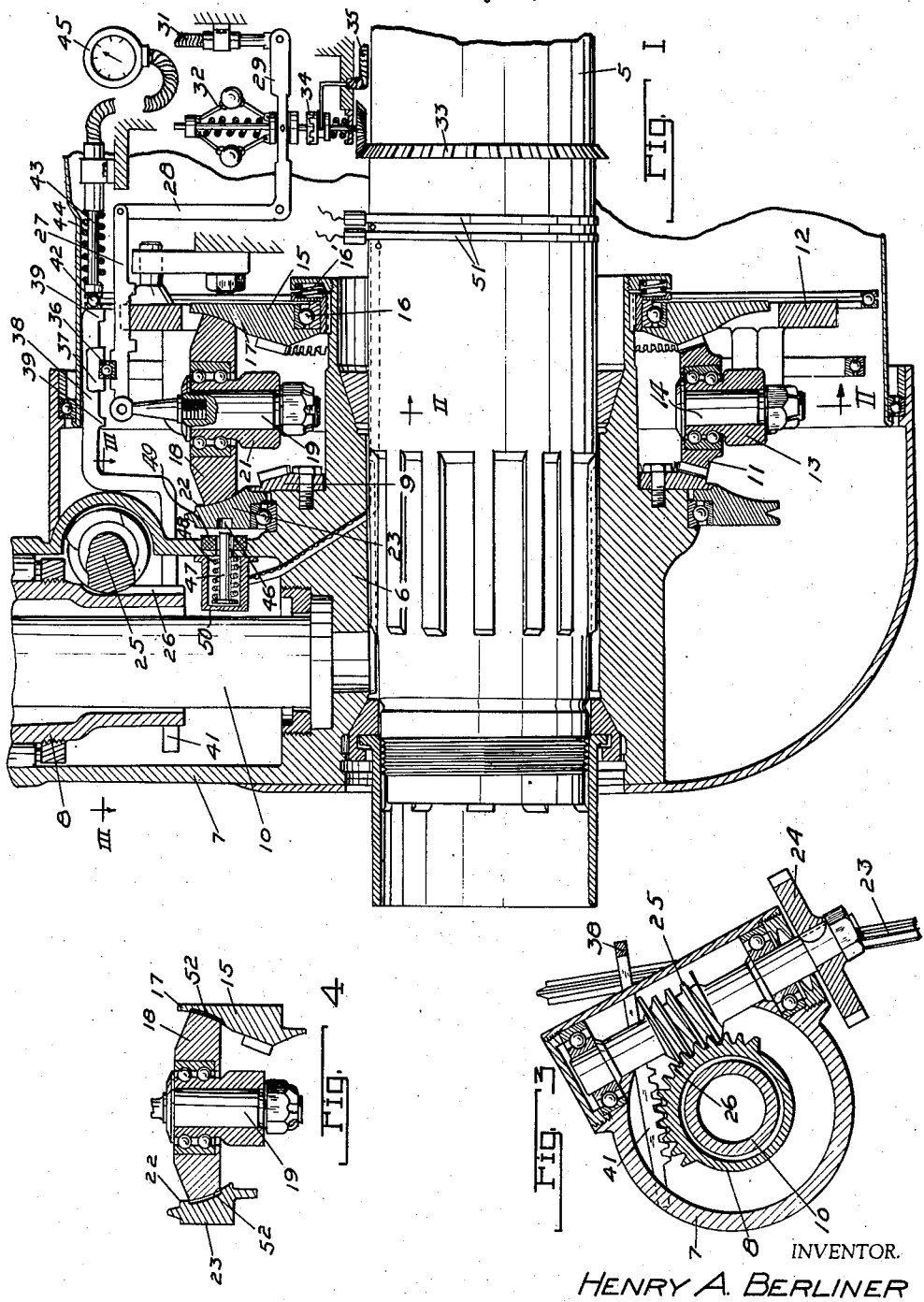
Figure 1 is a more or less diagrammatic central section of a propeller embodying the invention.
Figure 2:
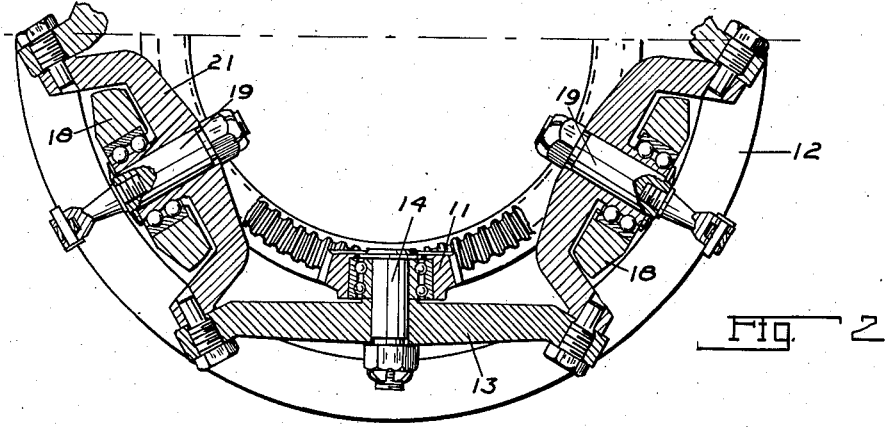

Figures 1 to 3 illustrate a variable pitch propeller for aircraft or the like comprising a propeller shaft 5 which may be the crankshaft of an engine or a suitable extension thereof and a hub 6 secured to the shaft 5. The hub is formed with sockets 7 rotatably carrying the root ends of blades 8 which may, if desired, be held in the sockets by tension members 10. The hub has a bevel ring gear 9 rigidly attached thereto which meshes with a bevel pinion 11 which is rotatably carried by a stationary support 12 non-rotatably carried by the engine housing or some other relatively stationary part of the aircraft. As best seen in Figure 2 the support 12 is formed with brackets 13 carrying spindles 14 on which the gears 11 are rotatably mounted. Preferably there are three gears 11 evenly spaced around the propeller shaft axis but obviously any desired number of gears could be provided.

The gears 11 mesh with and drive a series of bevel teeth formed on a ring 15 which is rotatably mounted on bearings 16 on the hub 6. The ring 15 is formed with an arcuate friction surface 17 for driving engagement with a series of rollers 18 which are rotatably mounted on spindles 19 carried by the support 12. As best seen in Figure 2 the spindles 19 are carried by frames 21 which are rotatably mounted on the brackets 13 to rotate about axes lying in a plane perpendicular to the propeller shaft.

The rollers 18 also drivably engage an arcuate friction surface 22 formed on a ring 23 which is rotatably mounted on the hub 6, driving contact between the rollers and the surfaces 17 and 22 preferably being maintained by a series of springs 16' pressing on the bearings 16. The ring 23 is formed around its periphery with a worm thread formed to mesh with a pinion 24 which is secured to the end of a worm 25 rotatably mounted in the hub 6. The worm 25 meshes with gear teeth 26 formed on the root end of the blade 8 so that when the worm is rotated about its own axis the pitch of the blade will be adjusted.

In order to control the transmission ratio between the rings 15 and 23, the spindles 19 are preferably provided with interconnected extensions at least one of which is pivotally connected to a rod 27 lying parallel to the axis of shaft 5. The rod 27 is pivotally connected at its other end to one end 28 of a bell crank lever which is pivoted at its center to the frame or other stationary part. The bell crank lever has a horizontal arm 29 connected to a Bowden control 31 which may be operated from the cockpit to adjust the position of the roller 18 about the pivotal axis of the frame 21.

When the propeller shaft is turning, the gear 9 will drive the pinions 11 to turn the ring 15 in the direction opposite to that in which the shaft is turning, this gear mechanism forming a constant speed transmission. The ring 15 drives the rollers 18 to drive the ring 23 in the same direction as the propeller shaft. When the parts are in the position shown in Figure 1, with the rollers 18 lying parallel to the shaft, the ring 23 will turn at the same speed as the propeller shaft and the worm 25 and the blades will remain stationary. To change the blade pitch the control 31 may be operated to tilt the rollers 18 so that the ring 23 will be driven either slower or faster than the ring 15 thereby turning the ring 23 relative to the shaft. As the ring turns the spiral worm tooth thereon will turn the gear 24 and worm 25 thereby rotating the blade in its socket to change its pitch. As shown, the parts are so arranged that when the upper end of the spindle 19 is tilted to the left, the blade will be turned counterclockwise as viewed from the root end, although this is not essential.

The invention preferably provides automatic control means to maintain the blades in the position for maximum efficiency at all times and, as shown, such means comprises a fly-ball governor 32 connected to the bell crank arm 29. The governor is preferably driven from a gear 33 on the shaft 5 through a dog clutch 34 but it will be apparent that it could be driven equally well from any rotating part of the engine which drives the shaft 5. A Bowden control 35 is preferably provided to disengage the clutch 34 so that the governor 32 will be idle and the arm 29 can be controlled by the control 31.

When the shaft 5 is rotating at the speed for which the governor is set, the rollers 18 will be held in the neutral position shown in Figure 1 in which no change in pitch is effected. However, if the speed of shaft 5 should change due to changes in flight conditions, the governor will function either to increase or decrease the blade pitch, thereby to increase or decrease the resistance to turning offered by the blade to bring the shaft speed back to the set value. In this way the blade pitch is automatically maintained at the correct value at all times.

If desired, the manual control 31 may be operated to overpower the governor to effect a manual control of the blade pitch. However, when this is desired, the clutch 34 is preferably disengaged so that the manual control may be operated more easily.

In order to limit the pitch of the blades, the rod 27 preferably carries an annular bearing 36 which serves to interconnect the extensions of spindles 19, and which has a yoke 37 slidably engaging a rod 38. Spaced stops 39 are formed on the rod to engage the yoke 37 and to permit a certain amount of lost motion and the end of the rod 38 is formed as a rack 41 (Figure 3) slidably mounted in the socket 7 and meshing with the gear teeth 26. As the blade turns in its socket the rod 38 will be moved axially of the propeller shaft until one of the stops 39 engages the yoke 37. Further movement of the blade and rod 38 will move the rod 27 to tilt the rollers 18 back to neutral position, thereby to stop the blade from turning. Thus the blade can turn through an angle determined by the amount of lost motion between the yoke 37 and stops 39 but will be effectively prevented from turning any further.

Since the rods 38 always occupy axial positions corresponding to the blade pitch, they may be utilized to operate a pitch indicator. In the structure shown, an annular thrust bearing 42 is carried by the rods 38 and engages a Bowden cable 43 which is urged against the bearing by a spring 44. A suitable indicator 45 may be located in the cockpit or any other desired place and connected to the cable 43 to be operated thereby. Thus the same mechanism which functions to limit the pitch serves also to indicate the pitch.

It may be desired under some circumstances to lock the blades against turning as a safety feature, and for this purpose the ring 23 is formed with a series of openings 46 adapted to be engaged by a pawl 47 mounted in the socket 7. The pawl 47 is preferably urged out of engagement with the ring 23 by a coil spring 48 housed in a casing 50 of brass or other non-magnetic material and may be urged into one of the openings 46 by a solenoid 49 connected through a pair of slip rings 51 to a switch (not shown) for operation by the pilot. When the solenoid is energized and pawl 47 is in one of the openings 46, the ring 23 is held stationary and the blades are locked against rotation in their sockets.

Figure 4 illustrates a slightly modified construction in which the surfaces 17 and 22 of the rings 15 and 23 are formed with grooves 52 adapted to register with the rollers 18 when they are in their neutral position. Thus when the rollers are in neutral, they will not contact the rings and there will be no tendency to wear when the blade pitch is not being changed.

Figure 5:
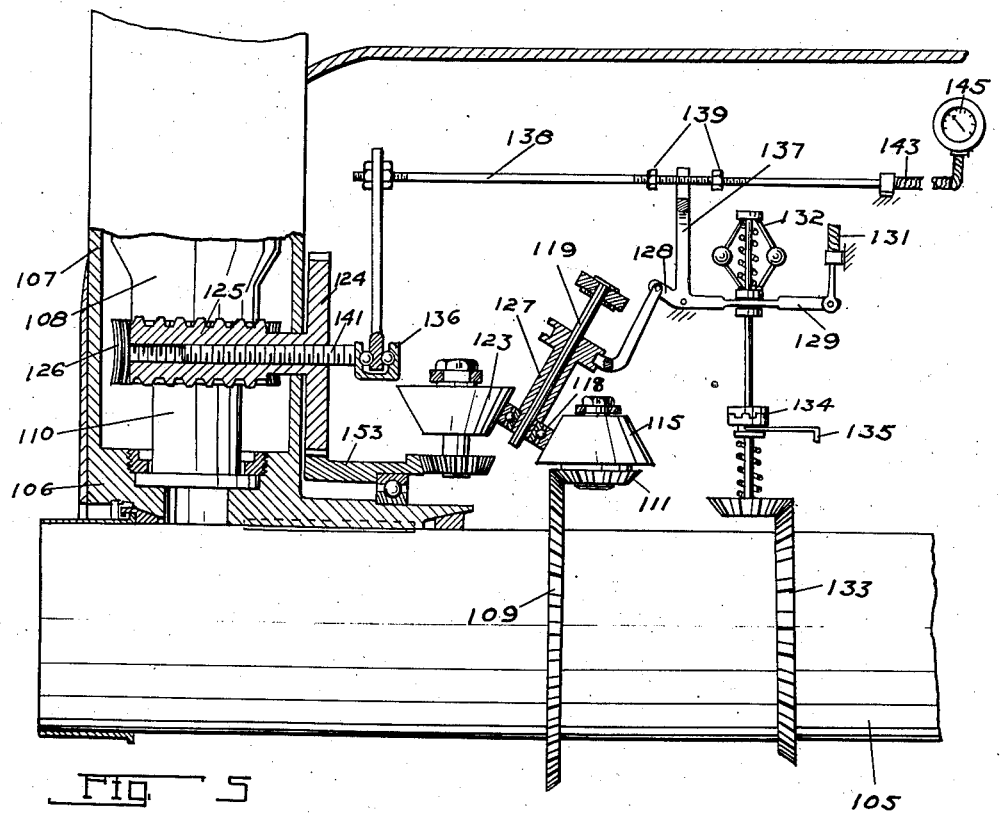
Figure 5 is a partial view similar to Figure 1 of a modified form of the invention.

Figure 5 illustrates a modified form of the invention, parts therein corresponding to like parts in Figures 1 to 3 being indicated by the same reference characters plus 100. In this modification the ring 15 is replaced by a cone 115 which is directly connected to the gear 111 driven from the gear 109 on the shaft 105. The ring 23 is replaced by a complementary cone 123 which is geared to a ring 153 rotatably mounted on the hub 106 and having a set of gear teeth to drive the gear 124 and worm 125 which changes the blade pitch. Drive is transmitted between the cones by a roller 118 which is slidably and rotatably mounted on a stationary spindle 119, the position of the roller being controlled by a sleeve 127 which is connected through a suitable yoke to a bell crank arm 128.

To operate the pitch limiting and indicating means, the worm 125 is tapped and a rod 141 is screw-threaded thereinto. The rod 141 is connected to an annular bearing 136 which is in turn connected to a rod 138 provided with stops 139 to move the rod axially. The stops 139 are adapted to engage a yoke 137 which is rigidly connected to the bell crank arms 128 and 129 to return the roller 118 to its neutral position and to limit the blade pitch. The rod 138 may be connected directly to a Bowden control 143 for operating an indicator 145.

Operation of the modification of Figure 5 is substantially the same as that of the first embodiment described except that the roller 118 is shifted axially of the spindle 119 instead of being tilted. It will be noted that the gears 109 and 111 form a fixed ratio transmission producing one reversal and the cones and roller form a variable speed transmission to provide another reversal whereby the ring 153 will be driven in the same direction as the shaft 105. As the worm 125 is turned to change the blade pitch, the rod 141 will be moved axially of the propeller shaft to operate the pitch-limiting means and the indicator as will be understood.

It will be apparent that the invention may be applied to propellers having two, three, or more blades and that various other changes and modifications might be made without departing from the spirit or scope of the invention. For example, the positions of the variable speed transmission and the constant speed transmission could be reversed or two variable speed transmissions could be employed. It is accordingly not intended to be limited to the forms shown nor otherwise than by the terms of the appended claims.

What is claimed is:

1. In a variable pitch propeller having a propeller shaft and a blade adjustably carried by said shaft, pitch changing mechanism comprising a transmission having a driving member driven by and in the same direction as said propeller shaft and an annular driven member concentric with the propeller shaft and driven in the opposite direction, a second transmission driven by said driven member and having a second annular driven member concentric with the propeller shaft and rotating in the same direction as the propeller shaft, means operated by said second driven member to adjust the blade pitch, and means to vary the ratio of one of said transmissions.

2. In a variable pitch propeller having a propeller shaft and a blade adjustably carried by said shaft, pitch changing mechanism comprising a gear secured to said shaft, a pinion rotatable about a fixed axis and meshing with said gear, a ring member rotatably mounted on the shaft and driven by said pinion, a second ring member rotatably mounted on the shaft, a friction roller drivably engaging said ring members to drive the second ring member from the first, means to adjust said roller thereby to vary the driving ratio between the ring members, and means operated by the second ring member to adjust the pitch of the blade.

3. In a variable pitch propeller having a propeller shaft and a blade adjustably carried by said shaft, pitch changing mechanism comprising an annular ring rotatably mounted on the shaft and having a driving surface formed on one of its surfaces, means connecting said ring to the blade to control the position thereof, a traction roller drivably engaging said driving surface, an annular driving element surrounding and secured to the shaft, means driven by said element for driving the roller, said roller having a neutral position in which it is ineffective to vary the blade pitch and operating positions in which it changes the blade pitch, control means for adjusting the roller, and means operable in accordance with changes in the blade pitch to operate said control means to move the roller to its neutral position when the blade reaches a predetermined pitch thereby to limit the movement of the blade.

4. In a variable pitch propeller having a propeller shaft and a blade adjustably carried by said shaft, pitch changing mechanism comprising an annular ring rotatably mounted on the shaft and having a driving surface formed on one of its surfaces, means connecting said ring to the blade to control the position thereof, a traction roller drivably engaging said driving surface, an annular driving element surrounding and secured to the shaft, means driven by said element for driving the roller, said roller having a neutral position in which it is ineffective to vary the blade pitch and operating positions in which it changes the blade pitch, control means for adjusting the roller, means operable in accordance with the blade pitch to move to positions corresponding to the blade pitch, and a lost motion connection between said last named means and the control means to move the roller to its neutral position when the blade reaches a predetermined pitch.

5. In a variable pitch propeller having a propeller shaft and a blade adjustably carried by said shaft, pitch changing mechanism comprising an annular ring rotatably mounted on the shaft and having a driving surface formed on one of its faces, means connecting the roller to the blade to vary the pitch thereof, a traction roller drivably engaging the ring, an annular driving element surrounding and secured to the shaft, means driven by said element for driving the roller control means for the roller, a member movable axially of the propeller shaft in accordance with changes in the blade pitch, a connection between said member and the controlling means to limit movement of the blade and a pitch indicator connected to said member to be operated thereby.

6. In a variable pitch propeller having a propeller shaft and a blade adjustably carried by said shaft, pitch changing mechanism comprising an annular ring rotatably mounted on the shaft and having a driving surface formed on one of its faces, means connecting the roller to the blade to change the blade pitch, a traction roller drivably engaging the ring, an annular driving element surrounding and secured to the shaft, means driven by said element for driving the roller, control means for the roller, gear means on the blade, a rack member meshing with said gear means, and a lost motion connection between said rack member and said control means.

7. In a variable pitch propeller having a propeller shaft and a blade adjustably carried by said shaft, pitch changing mechanism comprising an annular ring rotatably mounted on the shaft and having a driving surface formed on one of its faces, means connecting the roller to the blade to change the blade pitch, a traction roller drivably engaging the ring, an annular driving element surrounding and secured to the shaft, means driven by said element for driving the roller, control means for the roller, gear means on the blade, a rack member meshing with said gear means, a lost motion connection between said rack member and said control means, and a pitch indicator connected to said rack member to be operated thereby.

8. In a variable pitch propeller having a propeller shaft and a blade adjustably carried by said shaft, pitch changing mechanism comprising an annular ring rotatably mounted on the shaft and having a driving surface formed on one of its faces, means connecting said ring to the blade, a traction roller drivably engaging the driving surface, an annular driving element surrounding and secured to the shaft, means driven by said element for driving the roller, control means for the roller to vary the driving ratio thereof, and a governor driven directly by the propeller shaft independently of said variable speed transmission at a speed proportional to the propeller shaft speed to operate said control means.

9. In a variable pitch propeller having a propeller shaft and a blade adjustably carried by said shaft, pitch changing mechanism comprising an annular ring rotatably mounted on the shaft and having a driving surface formed on one of its faces, means connecting said ring to the blade, a traction roller drivably engaging the driving surface, an annular driving element surrounding and secured to the shaft, means driven by said element for driving the roller, control means for the roller to vary the driving ratio thereof, a governor driven at a speed proportional to the propeller shaft speed to operate said control means, and manual means to operate said control means independently of the governor.

10. In a variable pitch propeller having a propeller shaft and a blade adjustably carried by said shaft, pitch changing mechanism comprising an annular ring rotatably mounted on the shaft and having a driving surface formed on one of its faces, means connecting said ring to the blade, a traction roller drivably engaging the driving surface, an annular driving element surrounding and secured to the shaft, means driven by said element for driving the roller, control means for the roller to vary the driving ratio thereof, a governor driven directly by the propeller shaft independently of said variable speed transmission at a speed proportional to the propeller shaft speed to operate said control means, manual means to operate said control means independently of the governor, and pitch limiting means operated in accordance with the blade pitch to operate said control means irrespective of said governor or said manual means.

11. In a variable pitch propeller having a propeller shaft and a blade adjustably carried by said shaft, pitch changing mechanism comprising an annular ring rotatably mounted on the shaft and having a driving surface formed on one of its faces, means connecting said ring to the blade, a traction roller drivably engaging the driving surface, an annular driving element surrounding and secured to the shaft, means driven by said element for driving the roller, control means for the roller to vary the driving ratio thereof, a governor, means including a clutch for drivably connecting said governor to the propeller shaft, a connection from the governor to said control means, and manual means to disengage said clutch whereby the control means may be operated independent of the governor.

12. In a variable pitch propeller having a propeller shaft and a blade adjustably carried by said shaft, pitch changing mechanism comprising a worm gear on the blade, a worm meshing with said worm gear, a ring rotatably mounted on the propeller shaft and drivably connected to the worm, a second ring rotatably mounted on the propeller shaft, means for driving said second ring in the opposite direction to the propeller shaft, a friction roller drivably connecting said rings, said roller being tiltable to vary the driving ratio between the rings, a governor driven by the propeller shaft, a connection from the governor to the roller to tilt the same as the shaft speed varies, a member movable axially of the propeller shaft in accordance with the blade pitch, and a lost motion connection between said member and the roller to move the roller to its neutral position when the blade reaches a predetermined pitch.

13. A variable pitch propeller comprising a propeller shaft, a blade adjustably carried by said shaft, an annular ring rotatably mounted on the shaft and having a driving surface formed on one of its faces; means connecting the ring to the blade, a traction roller drivably engaging said driving surface, an annular driving element surrounding and secured to the shaft, means driven by said element for driving the roller, means for adjusting the roller to vary its point of engagement with the driving surface, and means operable at will to lock said ring to the propeller shaft to rotate therewith.

14. A variable pitch propeller comprising a propeller shaft, a blade adjustably carried by said shaft, an annular ring rotatably mounted on the shaft and having a driving surface formed on one of its faces; means connecting the ring to the blade, a traction roller drivably engaging said driving surface, an annular gear member surrounding and secured to the shaft, means including a second gear member meshing with said annular gear member for driving the roller and means for adjusting the roller to vary its point of engagement with said driving surface thereby to change the speed of the ring.

15. A variable pitch propeller comprising a propeller shaft, a hub on said shaft, a blade adjustably carried by said hub, an annular ring rotatably mounted on the shaft adjacent the hub and formed with a driving surface on one of its faces, means connecting the ring to the blade, a traction roller drivably engaging the driving surface, an annular driving element surrounding and secured to the shaft, means driven by said element for driving the roller and means for adjusting the roller to vary its point of engagement with the driving surface, thereby to vary the speed of the ring.

16. In a variable pitch propeller having a propeller shaft and a blade, pitch changing mechanism comprising a traction roller, an annular disc surrounding the propeller shaft and having a driving surface on one of its faces engaging the edge of said roller to be driven thereby, an annular driving element surrounding and secured to the shaft, means including a relatively movable driving connection driven by said element to drive said roller directly from the propeller shaft means to adjust the point of engagement of the roller with the driving surface thereby to change its driving effect and means drivably connecting the annular disc to the blade.

HENRY A. BERLINER.

CERTIFICATE OF CORRECTION.

Patent No. 2,164,489. July 4, 1939.

HENRY A. BERLINER.

It is hereby certified that error appears in the printed specification of the above numbered patent requiring correction as follows: Page 4, second column, after the last line of claim 16 and before the signature to the specification, insert the following claim -

> 17. A variable pitch propeller comprising a propeller shaft, a blade adjustably carried by said shaft, an annular ring rotatably mounted on the shaft and having a driving surface formed on one of its faces, means connecting the ring to the blade whereby the pitch of the blade will be adjusted when the ring is turned on the shaft, a traction roller drivably engaging the ring, an annular driving element surrounding and secured to the shaft, means driven by said element for driving the roller, and means for adjusting the roller to vary its point of engagement with said driving surface whereby the ring may be driven at the same speed as or faster or slower than the shaft.

and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.